Oct. 28, 1969        C. F. MILLER        3,474,685

MICRO-POSITIONER

Filed Nov. 13, 1967        2 Sheets-Sheet 1

INVENTOR.
CHARLES FREDRICK MILLER
BY
ATTORNEY

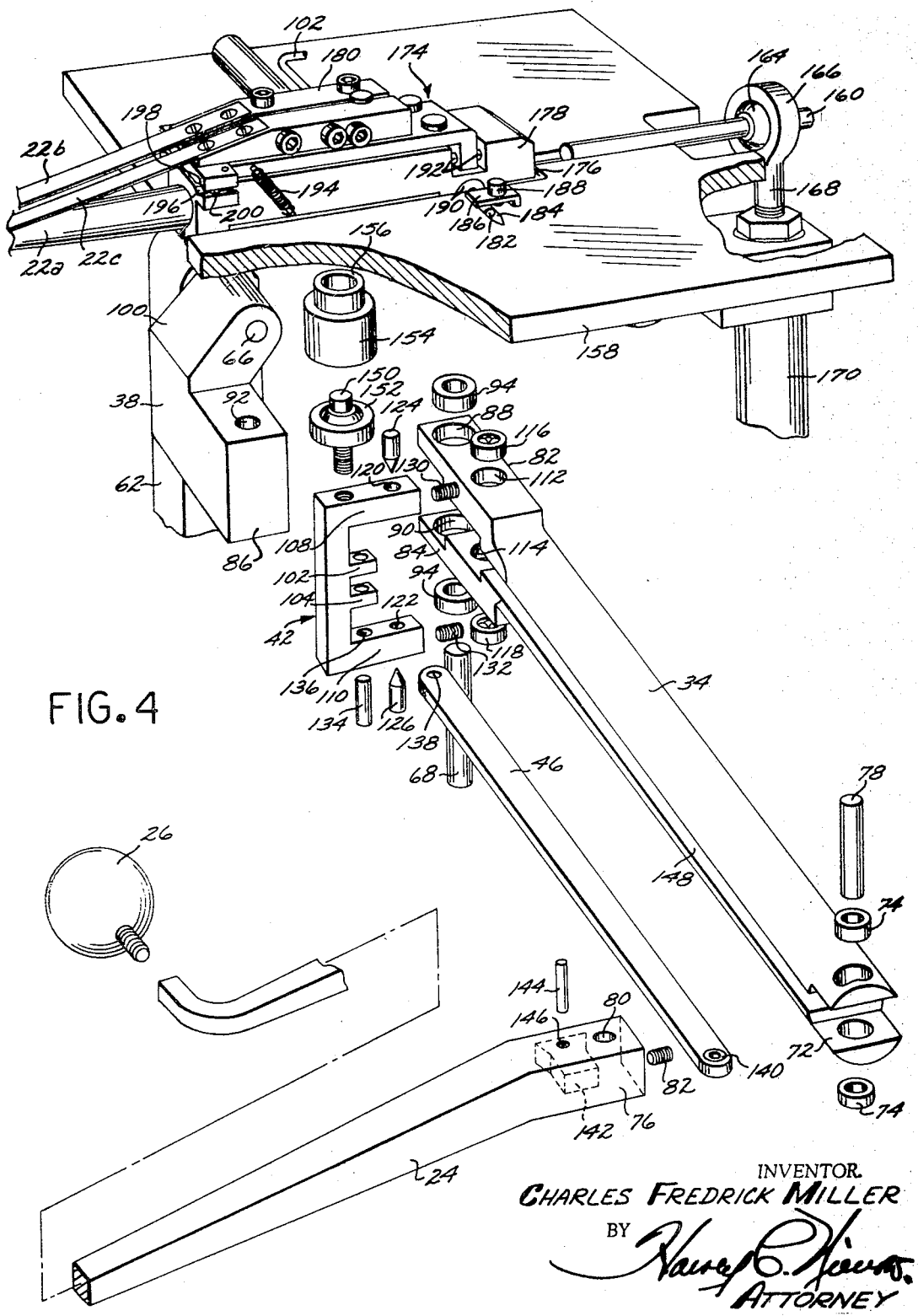

United States Patent Office 3,474,685
Patented Oct. 28, 1969

3,474,685
MICRO-POSITIONER
Charles Fredrick Miller, 2519 Strong Place,
Anaheim, Calif. 92806
Filed Nov. 13, 1967, Ser. No. 682,429
Int. Cl. G05g 9/00
U.S. Cl. 74—491                          16 Claims

ABSTRACT OF THE DISCLOSURE

The specification of this application describes a manually operated micro-positioning mechanism. A mechanism embodying the invention is shown incorporated into an instrument of the type used to assemble and electrically interconnect micro-circuit electronic units. The micro-positioner translates gross X, Y and Z motion of an input lever into X, Y and Z motion on a reduced scale of a tool platform. X and Z motion are accomplished by a pantograph which, in the embodiment selected for illustration, has one ratio of input to output movement along one axis and another ratio of input to output movement along the other axis. In the Y direction the same motion input structure operates as a simple lever. A tool holder is mounted on the tool platform so that motion in the Y direction is further refined. The tool holder is pivotally mounted on the tool platform so that the tool may be forced away from the work but so that, in this embodiment, the press of the tool on the work is independent of input pressure in the downward Y direction in the working range of the tool. The tool holder is formed in two parts which are movable relative to one another to permit relative movement in the Y-Z plane of tools held by the two parts of the holder.

---

This invention relates to micro-positioners. It relates particularly to mechanisms which translate displacement inputs in the X, Y and Z axes into output movements which are some fractions of the movement of the input member.

An object of the invention is to provide an easily operated, smooth acting, reliable, and relatively low cost micro-positioner. A related object is to provide a micro-positioner enabling accomplishment of very delicate work accurately with a minimum amount of skill, dexterity and effort. Another object is to provide a micro-positioner which enables the accomplishment of fine work over prolonged periods of time with minimum operator fatigue and strain.

While not limited thereto, the invention is especially applicable to jewelry making, micro-circuit production and other tasks which employ relatively sophisticated tooling applied to very fine, high value work where cost of poor workmanship is prohibitive. The invention is particularly useful in manipulating the tooling employed to produce micro-circuit electronic devices and the embodiment of the invention selected for illustration in the drawings is shown in relation to such a device. Another object of the invention is to provide a novel and improved manipulator for micro-circuitry production tools.

These objects are realized in part by the provision of a pantograph which converts motion in one spacial plane, applied manually to an input member, into reduced scale motion in these planes respectively and to use the same mechanism and input member as a simple lever for producing motion in fractional degree in a perpendicular plane. It is an object of the invention to provide an improved mechanism employing the pantograph principle for producing motion in two dimensions and it is a further object of the invention to employ that same mechanism to produce motion in the third dimension by simple lever action.

These and other objects and advantages of the invention will be understood upon an examination of the following specification and of the accompanying drawings of one embodiment of the invention.

In the drawings:

FIGURE 4 is an isometric view of the pantograph and lever mechanism shown with its parts exploded, together with fragments of the tool platform and a tool carried by that platform.

Figure 1:
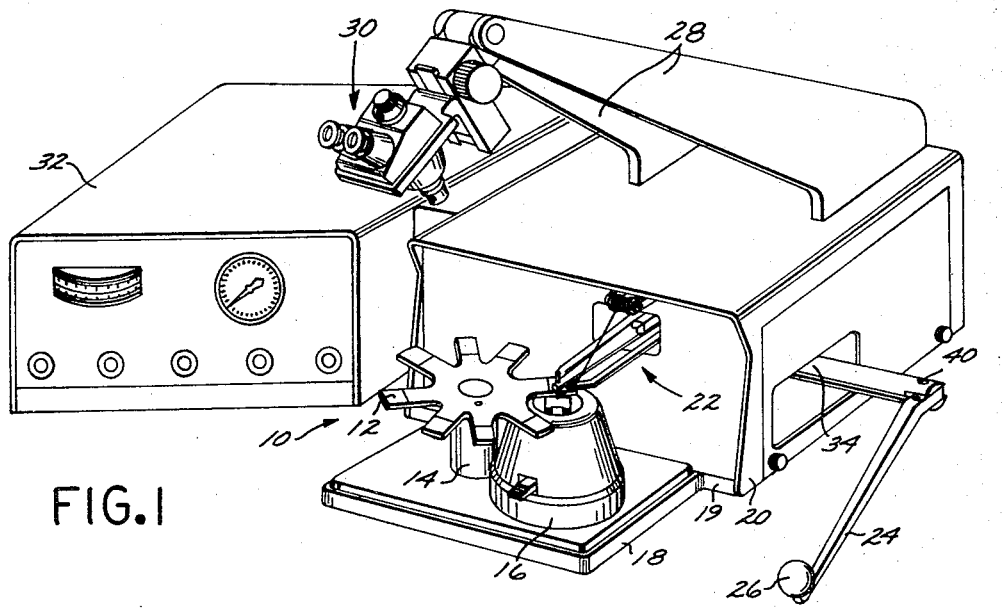
FIGURE 1 is an isometric view of a micro-circuitry bonding machine incorporating a micro-positioner embodying the invention.

Referring to FIGURE 1 of the drawings, there is shown a bonding machine generally designated 10 and comprising a rotatable carrousel 12 mounted upon a stand 14 and comprising a number of stations each adapted to accommodate active devices and components or other work members. The carrousel 12 rotates to place successive work members upon substrates positioned upon a work stand or anvil 16 where they are supported or heated or otherwise appropriately dealt with according to the requirements of the work to be accomplished. The stands 14 and 16 are mounted upon the front extension 18 of the base 19 of the tool control unit 20. The unit 20 houses the micro-positioner and the bonding tools, generally designated 22, which are shown to protrude from the front of the unit 20 to a position over the work stand 16. The lever 24, with the ball 26 at its end, is the input element of the micro-positioner. A pair of arms 28 extending upwardly and forwardly from the tool control unit 20 holds a microscope generally designated 30 through which the operator of the bonder views the work piece on the work stand 16 and the operative end of the tools 22.

The tools generally designated 22 in FIGURE 1 comprise three tools. One is a wire feed unit, another is an ultrasonic bonding unit and the third is a gas welding unit. The action of these tools, the temperature, the time duration over which they operate, the degree of any heating accomplished in work stand 16, and other process variables are controlled by a process control unit 32 which accompanies and is mounted upon the position control unit 20.

Figure 2:
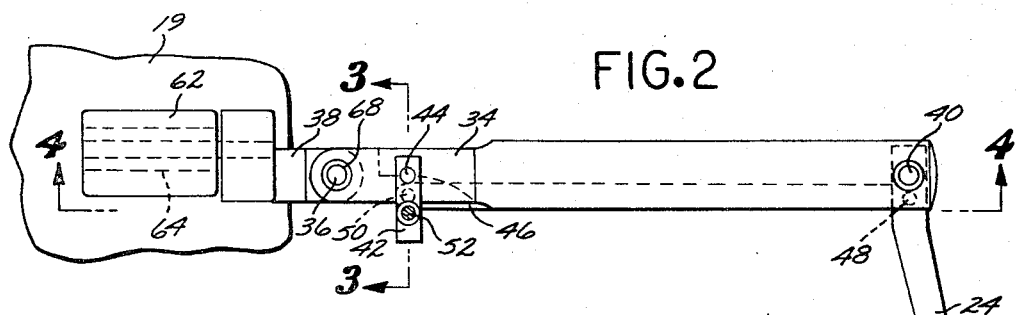
FIGURE 2 is a top plan view of the pantograph and lever assembly of the micro-positioner mounted upon the base, shown fragmented, of the bonding machine.

Referring next to FIGURE 2, there is shown a pantograph assembly which includes four arms. The first arm is the largest in FIGURE 2 and is designated by the numeral 34. It has a pivotal connection on a first axis designated 36 about a rotatable member 38 to be described subsequently. The second or input arm 24 has pivotal connection to the first arm 34 about an axis designated 40. The third arm 42 has pivotal mounting upon the first lever 34 about an axis designated 44. The fourth lever 46 is disposed within a longitudinal slot formed along the front side, in FIGURE 2, of the first arm 34. This arm has pivotal connection to arm 24 at a pivot point designated 48 and it has pivotal connection to arm 42 at a pivot axis or point 50.

In the preferred embodiment of the invention selected for illustration in the drawings, the first pivotal axis 36, the second pivotal axis 40, and the third pivotal axis 44 all lie in substantially the same plane. Axes 48 and 50 are parallel to the three axes 36, 40 and 44 when the ball 26 at the end of input arm 24 is moved left or right, in the X axis in FIGURE 2, the fourth arm 46 is moved in the X direction relative to the first arm 34. As an incident to this motion the third arm 42 is rotated about its pivot 44 to carry its output member 52 right or left in the X direction. If the ball 26 and the input arm 24 are moved toward and away from the operator in the Z direction in FIGURE 1, or in the direction of the top or the bottom of the page on which FIGURE 2 is drawn, the first arm 34 will be rotated about its axis 36. Following this motion, the output element 52 will move back and forth in the Z direction. In the embodiment shown the X direction movement of the third arm is one-sixteenth that of the second arm. In the Z direction the ratio of arm two to arm three displacement is eight.

Figure 3:
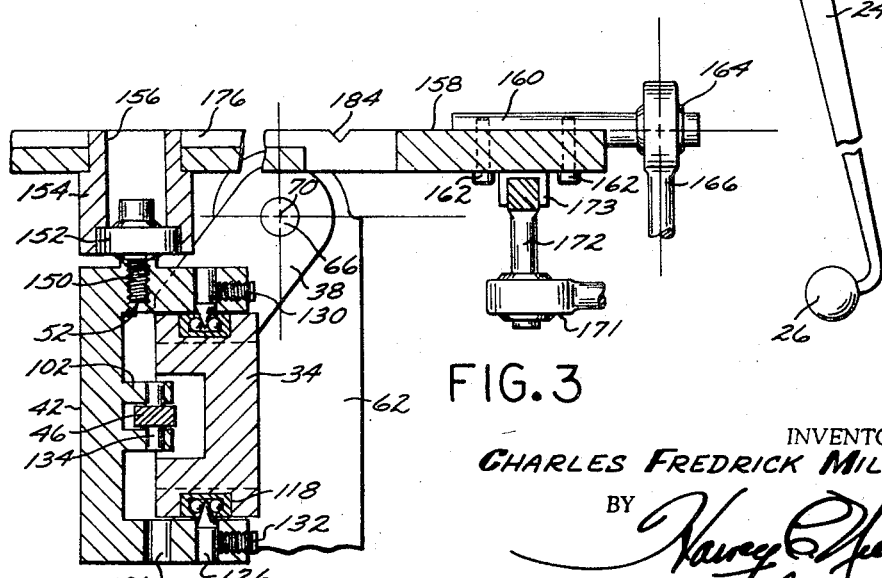
FIGURE 3 is a cross-sectional view taken on line 3—3 of FIGURE 2, showing fragments of the tool platform to which the pantograph and lever assembly of FIGURE 2 is attached.

The base member 19 of the position control unit 20 lies horizontal when the unit is in use and it has an integrally formed support 62 extending upwardly from it as best shown in FIGURE 3. Near its upper end the support 62 is provided with a lateral bore which is fitted with a bearing not shown except by the dotted lines 64 in FIGURE 2. A pivot pin 66, rotatable in this bearing 64, is fitted into an opening in one leg 100 of the L-shaped rotatable member 38. The first arm 34 is pinned to the other leg 86 of the L-shaped rotatable member 38 by a pin 68 whose axis is the first axis 36. If the ball 26 is raised or lowered in the Y direction perpendicular to the page on which FIGURE 2 is drawn, the assembly comprising arms one, two, three and four and the rotatable member 38 will rotate about the axis, labeled 70 in FIGURE 3, of the pin 66 by which this assembly is mounted in bearing 64.

The relationship of the several parts of this assembly is best shown in FIGURE 4. The ball 26 is screwed upon the outer end of arm 24 whose inner end is of size to fit within a slot 72 formed by bifurcation of the outer end of the first arm 34. This bifurcated outer end of the arm is provided with a bore in which are accommodated upper and lower bushings 74. After the inner end 76 of the second arm 24 is inserted in slot 72 of the first arm, a pivot pin 78 is inserted through the bushings 74 and a through opening 80 in end 76 of arm 24 to form the pivot pin for relative movement between these two arms. A set screw 82 is threaded into an opening in the end 76 of arm 24 (the opening is not visible in the drawing) and locks the pin in position relative to the second arm 24.

The other end of the first arm 34 is also bifurcated into an upper finger 82 and a lower finger 84. Leg 86 of the L-shaped rotatable member 38 is disposed between the fingers 82 and 84 so that the openings 88 and 90 at the outer end of the fingers 82 and 84 respectively are aligned with the pivot pin hole 92 in leg 86 of the L-shaped rotatable member 38. Two bearings designated 94, fit in the openings 88 and 90 respectively and accommodate the pivot pin 68 which is inserted through the two holes 88 and 90 and the hole 92. The axis of the pin 68 is the axis 36 of FIGURE 2 just as axis 40 of FIGURE 2 is the axis of pivot pin 78 in FIGURE 4.

As previously described, the rotatable L-shaped member 38 is mounted by the pivot pin 66 which extends through the other leg 100 of member 38, upon the upright support 62.

The third arm 42 is generally E-shaped with the center bar of the E divided into upper and lower sections 102 and 104, respectively. The upper and lower sections 108 and 110, respectively, of the E-shaped arm 42 form a yoke by which the arm is assembled over the bifurcated end of the first arm 34 at fingers 82 and 84. Fingers 82 and 84 are provided with aligned openings 112 and 114 which accommodate ball bearing thrust bearings 116 and 118, respectively. The thrust bearings are inserted in their respective openings in the fingers 82 and 84 and the upper and lower portions 108 and 110 are assembled yoke-like over the fingers 82 and 84 so that the pivot pin openings 120 and 122 are aligned with the thrust bearings 116 and 118. Then pivot pins 124 and 126 are inserted in openings 120 and 122 until the points of the pivot pins rest within the thrust bearings 116 and 118. Then the pins are fixed in position by set screws 130 and 132.

The fourth arm 46 is formed as a long thin bar having openings at its ends. The left end, in FIGURES 2 and 4 of the drawings, of the arm 46 is inserted between sections 102 and 104 of the third arm 42. A pin 134 is then inserted by means of an assembly opening 136 in lower portion 110 of the E-shaped arm 42, into the openings of sections 102 and 104 and the opening 138 in the left end of arm 46. The axis of pin 134 is the pivot axis designated 50 in FIGURE 2. The right end of arm 46 is fitted with a bearing 140. This end of arm 46 fits within a recess 142 shown in dotted lines in FIGURE 4. After assembly of the left end of the arm in this recess, the pivot pin 144 is assembled into the opening 146 of arm 24 and to bushing 140.

The first arm 34 is provided with a longitudinal slot 148 which extends the length of the arm between its bifurcated ends and lies at the front face of the arm in a plane perpendicular to the several pivot pins which extend through the arm. When the several elements are assembled the arm 46 lies within the slot or recess 148. This construction provides close spacing of the pairs of pantograph pivots at the ends of the first arm 34. It has the advantage that it provides a neat construction protected from dirt and not readily damaged. The structural arrangement of the mounting of arm 42 on arm 34 and of arm 46 on arm 42 is best shown in FIGURE 3.

The output member 52 comprises a ball joint, in this embodiment, the center shaft 150 of which is threaded into the upper segment of the E-shaped arm 42. A ring 152 encompasses the ball portion of the shaft and is press-fitted into the lower end of a sleeve 154 whose upper end at 156 is press-fitted into an opening in the forward central portion of the tooling platform 158. A rod 160 is fastened by machine screws 162 to the rear portion of the tooling platform such that the end of the rod extends beyond the rear edge of the platform. This rod 160 has a sliding fit in the axial opening of the ball 164 of a ball and socket unit 166. The socket is provided with a laterally extended threaded post 168 which is threaded into the end of a stand-off post 170. A similar ball and socket structure 171 cooperates with a rod 172, pivotally mounted on platform 158 in such a way as to provide a third mounting point for the platform 158. The post 170 is fixed to the base of the positioner unit 20. The tool platform 158 is provided with a recess formed in the upper face of the platform from its front edge and extending part way along the midline of the plate. A tool holder generally designated 174 is disposed in that recess 176. The tool holder 174 comprises a lower section 178 which carries a tool 22a and an upper section 180 which carries tools 22b and 22c. The upper face of the tool platform 158 is cut away at each side of the recess 176 to form a lateral notch or groove extending to each side of the recess 176. The lower portion 178 of the tool holder 174 is pivotally mounted in the recess by pivot pins which are disposed in these lateral notches and are held by a hold-down clamp in the notch with their pivot ends in engagement with thrust bearings carried in the sides of the lower portions 78 of the tool. The set of hardware on one side of the tool is visible in FIGURE 4. It consists of the pivot pin 182 which is disposed in notch 184 and is there held by a hold-down clamp 186 retained in position by a thumb screw 188 with the end of the pivot pin 182 extending into a thrust bearing 190.

The two sections 178 and 180 of the tool holder are held together at the rear by an actuating mechanism a part 192 of which is visible in FIGURE 4. At their forward ends the two sections of the tool holder 174 are held together by a pair of springs one of which, numbered 194, is visible in FIGURE 4. The upper face of the lower section 178 of the tool holder is provided with a V-notch on each side. These V-notches extend rearwardly parallel to the center line of the tool from a greater depth at the front of the notch to a shallower depth at the rear of the notch. The upper section 180 of the tool holder is provided with a complementary notch which is shallow at the front edge and increases its depth at its rear end. The notches on one side of the tool holder are visible in FIGURE 4. The lower notch is designated by the numeral 196 and the notch in the upper portion 180 of the tool holder is designated by the numeral 198. A ball 200 is disposed between the two notches. The spring 194 is arranged to hold the forward end of the upper section 180 down upon the lower section 178 and also to urge the section 180 rearwardly relative to the lower section 178. This tendency to urge the upper section of the tool holder rearwardly relative to the lower section results, when there is such motion, in the ball 200 running up the V-notch 196 to its shallow end and up the V-notch 198 to its shallow end with the result that the upper section 180 is moved upwardly relative to lower section 178. Fluid pressure applied at an inlet conductor 102 and acting on the actuator of which elements 192 are a part, forces the upper section 180 to move forward relative to the lower section 178 of the tool 174 holder. This has the effect of moving tools 22b and 22c forward relative to tool 22a. In addition, this action results in movement between the two portions of the tool holder such that the ball 200 is rolled toward the deep end of the two V-notches 196 and 198 permitting the two sections of the tool holder to be draw closer together by the bias of spring 194. Accordingly, tools 22b and 22c also move downwardly relative to tool 22a. The tool holder 174 is mounted upon the tool platform 158 by the pivot pins 182. Thus, the tool holder 174 may pivot relative to the tool platform. It may not pivot downwardly beyond the point at which the tool holder comes to rest upon the tool platform 158 at the bottom of recess 176 but it is free to rotate upwardly through a substantial arc to carry the tools upward away from the carrousel 12 and work stand 16. This construction permits the tools to be lifted away from the work piece by lifting on the ball 26 and it permits lowering the tools to rest on the work piece by lowering the ball 26 but it precludes forcing the tools to press harder on the work piece by pressing down on ball 26. The pivotal axis on which the tool holder 174 rotates relative to the tool platform 158 is rearwardly of the center of gravity of the tool holder and its tools.

In operation of the unit so that the actuating handle or ball 26 is moved left or right or up and down as viewed by an operator facing the unit of FIGURE 1 and by moving the ball 26 toward and away from that operator, the tools 22 are moved left or right, up or down and toward or away from the operator. If the ball is moved to the right, arm 24 pivots on axis 40 to draw arm 46 to the right by virtue of the pivotal connection of arms 24 and 46 on axis 48. The other end of arm 46 having pivotal connection to arm 42 on axis 50, arm 42 is caused to move to the right by rotation relative to arm 34 about pivotal axis 44. Accordingly, output member 52 is moved to the right. The output member being fixed to the tool platform 158, the latter is rotated to the right about its pivotal connection to the base of the unit at the interconnection of rod 160 and ball socket 166. Rearward movement of ball 26 results in rotation of arm 34 relative to the L-shaped member 38 about pivot pin 68 on pivotal axis 36. Arm 42, being pinned to arm 34 by pivot pins 124 and 126, moves rearwardly with that portion of arm 34 to which it is connected. Rearward motion of arm 42 carries with it output member 52. Output member 52 being fixed to platform 158, the latter is moved rearwardly relative to the base of the unit and to ball socket joint 166. The rod 160 carried by platform 158 slides rearwardly through the ball 164 of ball socket 166 to permit rearward movement of the platform. If ball 26 is moved upwardly to rotate arm 24, the arm 34 will likewise be rotated because of interconnection between the two arms at pin 78. Arm 34 being pinned by pin 68 to the rotatable L-shaped member 38, the latter is rotated on its pin 66 in bearing 64 relative to the stand-off post 62 and the base of the unit. Rotation of arm 34 results also in rotation of arm 42 because the latter is pinned to arm 34 by the pivot pins 124 and 126. Such rotation caused by upward movement of ball 26 carries output member 52 upwardly. This member being fixed to the tool platform 158 results in upward movement of the forward portion of the tool platform or rotation of the platform 158 about its connection to the base at the interconnection of rod 160 and ball socket joint 166.

Movement of the tool platform 158 to the left or right and rearwardly or forwardly results in corresponding motion of both sections 178 and 180 of the tool holder 174. Upward motion of the front portion of tool platform 158 results in corresponding upward motion of the tool holder 174 when the latter rests upon platform 158 at the bottom of recess 176. When the platform is lowered, the tool holder 174 will also be lowered as an incident to gravitational force until the tools 22 come to rest upon the work stand 16 or the carrousel 12 or upon a work piece held by them. Thereafter, further lowering of ball 26 results in downward movement of the axis on which the tool holder and tool platform are interconnected but will not increase the downward force acting on tools held by the holder. Relative motion between the two sections of the tool holder may be produced as described above in any of the positions which the tool platform and tool holder may occupy.

In a preferred embodiment the distance from member 52 to the ball 164 is half the distance from the ball 167 to the tip of the tool set 22 so that the ultimate ratio of tool tip to X direction lever movement is 8 to 1 whereby the X and Z direction motion ratios are made equal.

Although I have shown and described certain specific embodiments of my invention, I am fully aware that many modifications thereof are possible.

I claim:
1. A micro-positioner comprising:
   a first arm pivotally mounted for movement about a first axis;
   a second arm carried by said first arm and mounted for pivotal movement about a second axis parallel to said first axis;
   a third arm carried by said first arm and mounted for pivotal movement about a third axis parallel to said first and second axes;
   means carried by said second arm for causing rotational movement of said third arm about said third axis proportional to rotational movement of said second arm about said second axis and in which said means comprises a fourth arm pivotally connected to each of said second and said third arms on axes parallel to said first, second, and third axes, and in which said first arm is pivoted additionally for movement about a fourth axis which is normal to a plane containing said first axis.

2. A micro-positioner comprising a first arm pivotally mounted for movement about a first axis, a second arm carried by said first arm and mounted for pivotal movement about a second axis parallel to said first axis; a third arm carried by said first arm and mounted for pivotal movement about a third axis parallel to said first and second axes; means carried by said second arm for causing rotational movement of said third arm about said third axis proportional to rotational movement of said second arm about said second axis, and in which said first, second and third arms are mounted for pivotal movement about said first, second and third axes which lie in a common plane.

3. A micro-positioner comprising a first arm pivotally mounted for movement about a first axis; a second arm carried by said first arm and mounted for pivotal movement about a second axis parallel to said first axis; a third arm carried by said first arm and mounted for pivotal movement about a third axis parallel to said first and second axes; means carried by said second arm for causing rotational movement of said third arm about said third axis proportional to rotational movement of said second arm about said second axis, and in which said means comprises a fourth arm pivotally connected to each of said second and said third arms on axes parallel to said first, second and third axes, and in which said first arm is pivoted additionally for movement about a fourth axis which is normal to a plane containing said first axis; and which further comprises a base and in which said fourth axis occupies a parallel fixed position relative to said base.

4. The invention defined in claim 3, in which said tool platform is operatively connected to a base at a point on one side of a plane perpendicular to said base and containing said fourth axis and in which said tool platform is connected to said third arm at a point on the opposite side of said plane.

5. The invention defined in claim 1 including a base and a tool platform connected at one point to said third arm and operatively connected at another point to said base.

6. The invention defined in claim 5 including two universally movable interconnectors, the connection of said platform to said third arm and to said base being accomplished through said universally movable interconnectors.

7. The invention defined in claim 5 including a tool holder carried by said tool platform and mounted for rotation relative to said platform about a fifth axis lying in a plane perpendicular to a plane containing said two points.

8. The invention defined in claim 7, in which said tool holder comprises two parts, one movable relative to the other in a direction having one component parallel to said line containing said two points and another component perpendicular thereto in the plane containing said line and lying perpendicular to said fifth axis.

9. A micro-positioner comprising a first arm pivotally mounted for movement about a first axis; a second arm carried by said first arm and mounted for pivotal movement about a second axis parallel to said first axis; a third arm carried by said first arm and mounted for pivotal movement about a third axis parallel to said first and second axes; means carried by said second arm for causing rotational movement of said third arm about said third axis proportional to rotational movement of said second arm about said second axes, and in which said means comprises a fourth arm pivotally connected to each of said second and said third arms on axes parallel to said first, second and third axes, and in which said first arm comprises an elongate rod bifurcated at one end to form a slot; in which said second arm has one end disposed in said slot and there pivotally connected to said first arm; in which said first arm is provided with a longitudinal slot from said bifurcated end to the point of interconnection of said first and third arm; in which said second arm is provided with a recess; and in which said fourth arm is disposed in said longitudinal slot with one end extending into the recess of the second arm and is there pivotally connected to said second arm.

10. The invention defined in claim 9, in which said third arm is provided with a portion extending into said longitudinal slot to which the other end of said fourth arm is pivotally connected.

11. The invention defined in claim 10, in which said third arm comprises a yoke within which said first arm is disposed and to which said first arm has pivotal connection.

12. The invention defined in claim 11, which further comprises means for pivoting said first arm about a fourth axis which is normal to a plane containing said first axis.

13. The invention defined in claim 12 including a base and in which said means for pivoting said first arm about a fourth axis comprises a member mounted for rotation about said fourth axis parallel to and fixed relative to said base and to which said first arm is pivoted.

14. The invention defined in claim 12 including a tool platform having universal operative connection at one point to said base and having universal operative connection at another point to said third arm.

15. The invention defined in claim 3 including a tool platform connected at one point to said third arm and operatively connected at another point to said base.

16. The invention defined in claim 15 including a tool holder carried by said tool platform and mounted for rotation relative to said platform about a fifth axis perpendicular to a plane containing said one point and said other point.

References Cited

UNITED STATES PATENTS

| | | | |
|---|---|---|---|
| 3,188,879 | 6/1965 | Conley | 74—491 X |
| 3,306,696 | 2/1967 | Tann | 74—491 X |

MILTON KAUFMAN, Primary Examiner

U.S. Cl. X.R.

74—471; 214—1; 269—58